United States Patent [19]

Courtemanche

[11] Patent Number: 5,908,226
[45] Date of Patent: Jun. 1, 1999

[54] EMBOSSED WHEEL FOR SNOWMOBILE SUSPENSION ASSEMBLY

[75] Inventor: Denis Courtemanche, Richmond, Canada

[73] Assignee: Camoplast Inc., Plattsburgh, N.Y.

[21] Appl. No.: 09/025,509

[22] Filed: Feb. 18, 1998

[30] Foreign Application Priority Data

Feb. 20, 1997 [CA] Canada ................................... 2198068

[51] Int. Cl.⁶ .................................................. B62D 55/14
[52] U.S. Cl. .......................... 305/137; 305/179; 305/195
[58] Field of Search ...................... 305/124, 128, 305/129, 136, 137, 142, 178, 179, 180, 181, 184, 195, 199, 60

[56] References Cited

U.S. PATENT DOCUMENTS 916,601   3/1909   Roberts et al. .......................... 305/124
2,708,978  5/1955   Robitaille ............................. 305/181 X
3,113,805 12/1963   Nodwell .............................. 305/180 X
3,597,018  8/1971   Masaoka ............................. 305/136 X
4,856,853  8/1989   Bayoumi ............................. 305/199 X

FOREIGN PATENT DOCUMENTS 620668  10/1935  Germany ................................ 305/129

Primary Examiner—Russell D. Stormer
Attorney, Agent, or Firm—Joseph W. Molasky & Associates

[57] ABSTRACT

A guide wheel for use with the suspension assembly of a snowmobile vehicle is provided with an embossed rim surface. The later is formed of a succession of convex and concave surfaces, the convex surfaces contacting the inner side of the lower run of the snowmobile track while the concave surfaces are so disposed as to avoid contacting pressure on that part of the snowmobile track in which lies transverse reinforcing rods embedded in the track.

2 Claims, 2 Drawing Sheets

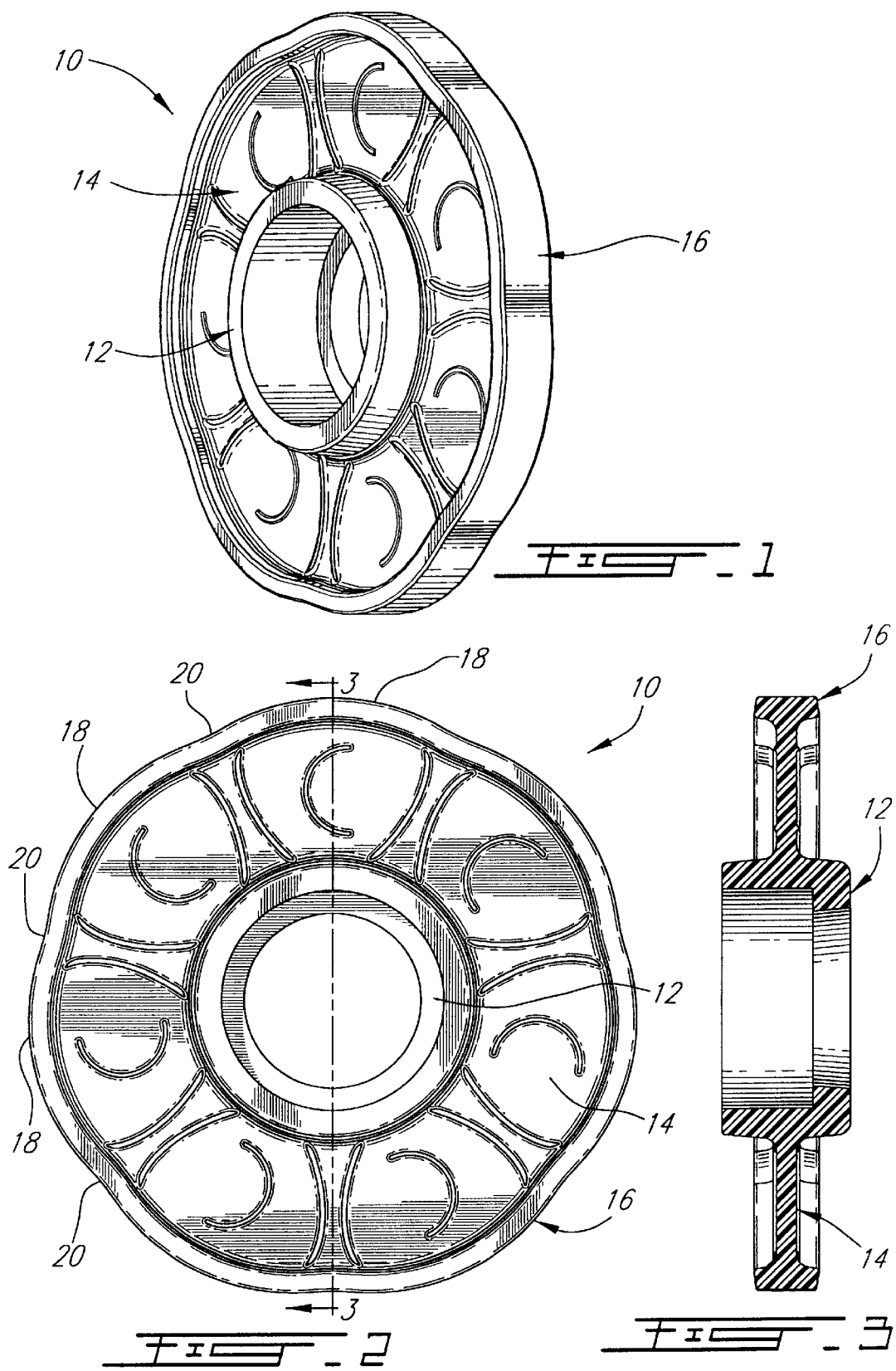

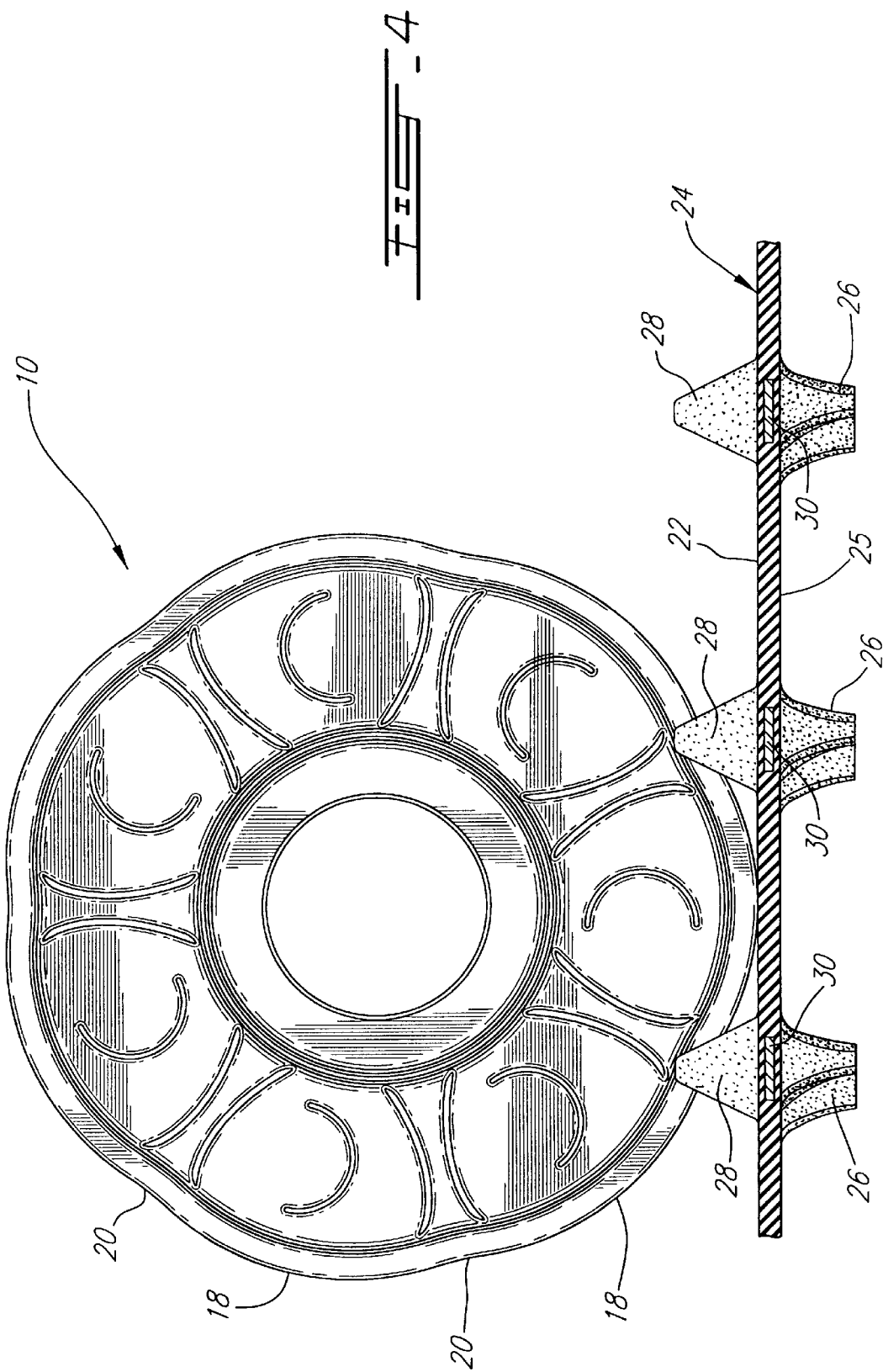

EMBOSSED WHEEL FOR SNOWMOBILE SUSPENSION ASSEMBLY

FIELD OF THE INVENTION

The present invention pertains to a guide wheel for use with the suspension assembly of a snowmobile vehicle.

BACKGROUND OF THE INVENTION

Present guide wheels of snowmobile suspension assemblies have a circular rim surface that applies continuous contact pressure on the inner surface of the lower run of a snowmobile track.

It has been found that, as a result of this contact pressure, reinforcing rods embedded in the track, become damaged. It has also been found that continuous contact pressure by these guide wheels is a source of noise.

STATEMENT OF THE INVENTION

It is an object of the present invention to provide a guide wheel for the suspension assembly of a snowmobile vehicle which avoids the above problems. This is achieved by configuring the rim surface of the guide wheel with a succession of convex and concave surfaces with the convex surfaces riding over those areas of the track in which the reinforcing rods are embedded.

IN THE DRAWINGS

FIG. 1 is a perspective view of a guide wheel made in accordance with the present invention;

FIG. 2 is a side elevational view thereof;

FIG. 3 is a cross-sectional view taken along lines 3—3 of FIG. 2; and

FIG. 4 is a side elevational view showing the guide wheel over a snowmobile track.

DESCRIPTION OF PREFERRED EMBODIMENTS

Referring to FIGS. 1, 2 and 3, there is shown a guide wheel, generally denoted 10, made in accordance with the present invention. It comprises a hub circular portion 12, a flat intermediate portion 14 and a peripheral rim 16.

The peripheral rim 16 is embossed consisting of a succession of convex surfaces 18 and concave surfaces 20.

Referring to FIG. 4, the guide wheel 10 is shown bearing against the inner face 22 of the lower run of a snowmobile track 24 having on its exterior surface 25 a series of ground engaging profiles 26. On the inner face 22 is integrally formed a series of lugs 28 which are adapted to be engaged by sprockets (not shown) for driving the track.

The construction of snowmobile tracks is well known. Most tracks have embedded transverse reinforcing rods 30 in the region of the lugs 28.

As can be seen in FIG. 4, the guide wheel 10 is so disposed relative to the track that the concave surfaces 20 will present themselves on the inner face of the track at the level of the transverse rods 30 so that no contacting pressure is exerted on the track in these areas. On the other hand, the convex surfaces 18 will apply pressure on the track in more efficient manner in the areas between the rods 30.

One preferred form of a guide wheel of the present invention is one made of plastics material, such as polyethylene.

Although the invention has been described above with respect with one specific form, it will be evident to a person skilled in the art that it may be modified and refined in various ways. It is therefore wished to have it understood that the present invention should not be limited in scope, except by the terms of the following claims.

I claim:

1. A guide wheel for use in the suspension assembly of a snowmobile comprising an endless track having an inner surface and a plurality of longitudinally spaced rods; said rods embedded in said track; said rods further defining in said track transverse rod embedded regions and rod free regions; said guide wheel further comprising a circular body having a peripheral embossed rim surface; said embossed rim surface comprising a plurality of concave and convex portions continuously extending circumferentially thereon; said convex and concave portions being so disposed in relation to said inner surface that during rotation of said wheel said convex portions contact said rod free regions of said track and said concave portions overlap said rod embedded regions of said track.

2. A guide wheel as defined in claim 1, wherein said guide wheel is made of a plastics material.

* * * * *